United States Patent Office 3,794,629
Patented Feb. 26, 1974

3,794,629
STABILIZED AROMATIC POLYCARBONATES
Erich Eimers, Dieter Margotte, Rolf Dhein, and Helmut Schmid, Krefeld, Germany, assignors to Bayer Aktiengesellschaft, Leverkusen, Germany
No Drawing. Filed Aug. 9, 1972, Ser. No. 278,909
Claims priority, application Germany, Aug. 11, 1971, P 21 40 207.3
Int. Cl. C08g 51/58
U.S. Cl. 260—45.8 A            8 Claims

ABSTRACT OF THE DISCLOSURE

Aromatic polycarbonates having added a neutral ester of phosphorous acid with at least one oxetane group, the latter functions as a stabilizer for the polycarbonate to lessen discoloration after exposure to heat. Thus, the polycarbonates of the invention are particularly useful in the lighting field.

STABILIZED AROMATIC POLYCARBONATES

This invention relates to aromatic polycarbonates stabilized against discoloration by heat, and to their production.

Aromatic polycarbonates on processing plastic forming equipment show a more or less intense discoloration and/or reduction in the transparency to light. As used herein, unless otherwise specifically noted, the term, polycarbonate, refers to aromatic polycarbonates derived from carbonate precursors and dihydroxy aromatic compounds as more particularly defined below. If polycarbonate thermoplastics are exposed to higher temperatures in air for a longer period, as is necessary, for example, when manufacturing large moldings or in various fields of use such as, for example, domes for light fittings, an intense yellowing or even brown discoloration occurs over a period of time.

Attempts have already been made to prevent these discolorations by adding tertiary phosphorous acid esters to the polycarbonates before or during processing. (German patent specification 1,128,653 and U.S. Pat. 3,305,520). The moldings manufactured from polycarbonates stabilized in this way are admittedly lighter than those which do not contain these additives, with the effect of lightening the color being the stronger, the higher is the concentration of the added phosphite stabilizer; however, it is found that an increasing concentration of the stabilizer in the polycarbonate is accompanied by an increasing degradation of the polycarbonate molecule, discernible from the decreasing relative viscosity of the latter. Furthermore, on heating to higher temperatures with access of air, a reversal of the color-lightening effect takes place, that is to say the moldings stabilized by the additives mentioned after a brief heat treatment already turn brown more rapidly than the non-stabilized products. This undesirable phenomenon also manifests itself the more strongly, the higher is the concentration of the phosphite stabilizer in the polycarbonate thermoplastic.

In order to avoid the disadvantages mentioned it has already been proposed to add to the polycarbonate, apart from the phosphite stabilizer, yet a further substance, namely glycerine or epoxide compounds (German Offenlegungsschrift (German published specification) 1,694,285 and German Offenlegungsschrift (German published specification) 2,039,971). As we have been able to show in comparison experiments, the homogenization of such a three-component system is difficult. Different moldings which have been manufactured from one and the same stabilizer-polycarbonate mixture proved to have different color stability under comparable conditions.

It is furthermore known, for purposes of stabilization, to manufacture aromatic polycarbonates which contain small amounts of co-condensed radicals of phosphorous acid, by condensing phosphorous trihalide in small amounts, together with phosgene, with bis-hydroxydiphenylalkanes to give the corresponding carbonic acid/phosphorous acid copolyesters (German Offenlegungsschrift (German published specification) 2,039,536). According to German Offenlegungsschrift (German published specification) 2,040,251, the stabilization of these thermoplastics against discoloration is improved yet further through adding small amounts of an epoxide compound to the co-condensates.

However, polycarbonates stabilized in this way suffer from the disadvantage that as a result of the incorporation of the easily hydrolyzable phosphorous acid groups the resistance to saponification is considerably reduced, which proves objectionable for many end uses.

It is therefore an object of this invention to provide polycarbonates stabilized against discoloration. A further object of this invention is to provide polycarbonates based on halogen containing phenols which have improved resistance to thermal degradation, particularly at unusually high temperatures. Another object of this invention is to provide a process of stabilizing aromatic polycarbonates against discoloration.

We have now discovered a new way of stabilizing aromatic polycarbonates against the discoloration described above.

This invention provides an aromatic polycarbonate having added a neutral ester of phosphorous acid [P(OH)$_3$] with an oxetane group (hereinafter frequently referred to as oxetane phosphites).

The invention also provides a process for the production of such polycarbonate, in which a neutral ester of phosphorous acid with an oxetane group is mixed into an aromatic polycarbonate.

As examples of such neutral esters of phosphorous acid (phosphites) there may be mentioned: tris-[(3-ethyloxetanyl-3)-methyl]-phosphite, tris-[(3 - pentyloxetanyl-3)-methyl]-phosphite, phenyl - bis - [(3-ethyloxetanyl-3)-methyl]-phosphite, 2 - phenoxy-spiro (1,3,2 - dioxaphosphorinane-5,3'-oxetane) and 3,3-bis-[spiro(oxetane-3',5''-(1'',3'',2'' - dioxaphosphorinane - 2'') - oxy - methyl]-oxetane, as well as those disclosed in U.S. Pat. 3,209,013, column 1, line 70 to column 3, line 10.

Thus a preferred group of oxetane phosphites are those of the formulae:

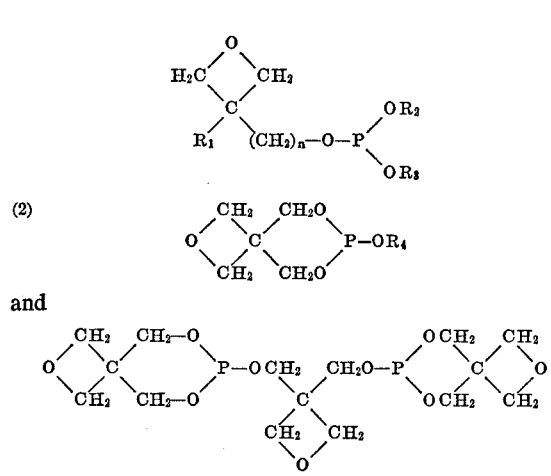

where $n$ is selected from the group consisting of 0 and 1, R$_1$ is selected from the group consisting of alkyl, aryl, aralkyl, halomethyl, cyanomethyl, alkoxymethyl, aryloxymethyl, aralkyloxymethyl or acyloxymethyl, $R_2$ and $R_3$ are

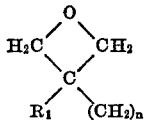

or alkyl, aryl, aralkyl, haloaryl, and $R_4$ is alkyl, aryl, aralkyl, haloaryl or

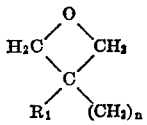

Preferably, $n$ is 1. Preferably, in Formula 1 all three ester groupings attached to the phosphorous atom are the same. $R_1$ is preferably lower alkyl or halo lower alkyl.

The phosphites used according to the invention, containing oxetane groups, can be employed both individually and in combination with one another. They can be obtained by trans-esterification of the appropriate alcohols or phenols containing oxetane groups with trialkyl- or triarylphosphites or by reaction of phosphorous trichloride with the appropriate alcohols or phenols, optionally mixed with other alcohols or phenols free of oxetane groups, in the presence of acid-binding agents (compare U.S. patent specification 3,209,013).

Alcohols or phenols containing oxetane groups from which the neutral esters can be prepared include, for example, 3-ethyl-3-hydroxymethyloxetane, 3-pentyl-3-hydroxymethyloxetane, 3,3-bis-hydroxymethyloxetane and p - (3 - ethyloxetanyl-3-hydroxymethyl)-phenol. Hydroxy compounds which can optionally also be used in the manufacture of the phosphites include: decyl alcohol, stearyl alcohol, benzyl alcohol, glycol, trimethylolpropane, pentaerythritol, glycerine, sorbitol, neopentyl glycol, dimethylolcyclohexane, diethylene glycol, triodiglycol, phenol, p-chlorophenol, p-nonylphenol, pyrocatechol and di-t-butyl-pyrocatechol.

Tris - (3 - ethyloxetanyl - 3 - methyl)-phosphite which, as a symmetrical trialkylphosphite, can be manufactured in a simple manner from the easily accessible 3-ethyl-3-hydroxymethyloxetane (compare U.S. patent specification 2,910,483) has proved particularly suitable. The presence of three oxetane groups in the molecule causes this compound to be particularly highly effective as a stabilizer.

Phosphites which contain at least one oxetane group in the molecule have already been patented as compounds and been claimed as stabilizers for halogenated polymers, especially polyvinyl chloride (U.S. 3,209,013). However, it was not foreseeable that these compounds would develop such a good stabilizer action also in polycondensates of the type of the arylenecarbonates, which undergo a completely different type of thermal degradation (formation of free phenols), and the thermoplastic processing of which takes place at unusually high temperatures.

Furthermore, the known phosphites mentioned are preferentially active as stabilizers for polyvinyl chloride polymers at concentrations of 0.2–5% by weight, while the stabilized polycarbonates claimed here contain a stabilizing amount of the phosphites containing oxetane groups usually in concentrations of only 0.01–0.2% by weight, preferably in concentrations of 0.025–0.1% by weight.

The stabilized polycarbonates can be manufactured by metering the phosphite either in a pure form into the fused polycarbonate or, if appropriate, as a solution in a low-boiling solvent (i.e., one boiling lower than the oxetane phosphite) such as methylene chloride, mono-chloro benzene or the like, into the polycarbonate solution. The polycarbonates claimed which are stabilized against discoloration can also be manufactured by impregnating the powdered or granulated polycarbonate with the phosphite (or, if appropriate, with its solution in a solvent) in a suitable mixing apparatus. The stabilized polycarbonate is then worked up in accordance with known techniques.

Among the phosphites mentioned, those compounds which possess a low volatility required for the special processing conditions of the polycarbonate are preferred, these generally being compounds of which the boiling point at 0.1 mm. Hg is above 150° C.

Possible polycarbonates are in general the polycondensates obtainable by reaction of dihydroxydiarylalkanes with phosgene or diesters of carbonic acid, and in addition to the unsubstituted dihydroxydiarylalkanes, those of which the aryl radicals carry methyl groups or halogen atoms in the o- and/or m-position to the hydroxyl group are also suitable. Equally, branched polycarbonates are suitable.

The polycarbonates to be stabilized have molecular weights between 10,000 and 100,000, preferably between 20,000 and 40,000.

Suitable aromatic dihydroxy compounds are, for example, hydroquinone, resorcinol, 4,4'-dihydroxydiphenyl, bis-(hydroxyphenyl)-alkanes for example $C_1$–$C_8$-alkylene- or $C_2$–$C_8$ - alkylidenebisphenols, bis-(hydroxy-phenyl)-cycloalkanes for example $C_5$–$C_{15}$-cycloalkylene- or $C_5$–$C_{15}$-cycloalkylidene-bisphenols, bis - (hydroxyphenyl) - sulphides, -ethers, -ketones, -sulphoxides or -sulphones, and also $\alpha,\alpha'$ - bis, - (hydroxyphenyl)-diisopropylbenzene as well as the corresponding nuclear-alkylated or nuclear-halogenated compounds. Polycarbonates based on bis-(4-hydroxyphenyl)-propane-2,2 (bisphenol A), bis-(4-hydroxy-3,5 - dichloro-phenyl)-propane - 2,2 (tetrachlorbisphenol A), bis-(4-hydroxy-3,5-dibrom-phenyl)-propane-2,2 (tetrabrom-bisphenol A), bis-(4-hydroxy-3,5-dimethyl-phenyl)-propane-2,2) (tetramethylbisphenol A), bis-(4-hydroxy-phenyl)-cyclohexan-1,1 (bisphenol Z), and those based on trinuclear bisphenols such as $\alpha,\alpha'$-bis-(4-hydroxyphenyl) - p - diisopropyl-benzene, are preferred.

Further bisphenols which are suitable for the manufacture of polycarbonate are described in U.S. patent specifications 3,028,365, 2,999,835, 3,148,172, 3,271,368, 2,970,-137, 2,991,273, 3,271,367, 3,280,078, 3,014,891 and 2,999,846.

The polycarbonates stabilized according to the invention can furthermore contain the known additives such as, for example, fillers, dyestuffs and/or pigments without this influencing the effect of the added phosphites containing oxetane groups.

The polycarbonates stabilized according to the invention are used particularly where the moldings manufactured are exposed to high heat for a prolonged period, and also for all articles for which high light transmission is demanded. This applies particularly to the use in the lighting field, for example for light covers or glazing with polycarbonate sheets.

The invention is further illustrated by the following examples in which parts are by weight unless otherwise indicated.

EXAMPLES

Manufacture of the polycarbonate

Approx. 454 parts of 4,4'-dihydroxydiphenyl-2,2-propane and 9.5 parts of p-tert.-butylphenol are suspended in 1.5 l. of water. The oxygen is removed from the reaction mixture in a 3-neck flask equipped with a stirrer and gas inlet tube, by passing nitrogen through the reaction mixture for 15 minutes while stirring. 355 parts of 45% strength sodium hydroxide solution and 1,000 parts of methylene chloride are then added. The mixture is cooled to 25°. 237 parts of phosgene are added over a period of 120 minutes while maintaining this temperature by cooling. An additional amount of 75 parts of a 45% strength sodium hydroxide solution is added after 15–30 minutes or after the absorption of phosgene has started. 1.6 parts of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free of salt and alkali. The polycarbonate is isolated from the washed solution, and dried. The polycarbonate has a relative viscosity of 1.29–1.30 measured in a 0.5% strength solution of methylene chloride at 20°. This corresponds approximately to a molecular weight of 32,000. The polycarbonate thus obtained is extruded and granulated.

Manufacture of the stabilized polycarbonate compositions

The granulated polycarbonate manufactured in accordance with the above description is mixed with the amounts of various phosphites listed in the table below by so-called tumbling. Thereafter, the granules are extruded at 300° C., using a mixing screw, to give a ribbon. This ribbon is again chopped into granules which are converted into standard test rods in an injection molding machine at 330° C.

The following phosphites were employed:

(1) Comparison experiment I

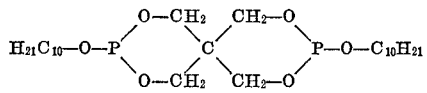

(2) Comparison experiment II (see German Auslegeschrift (German published specification) 1,252,208)

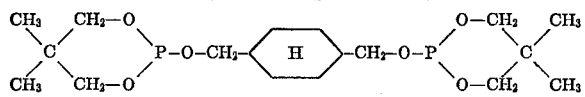

(3) Comparison experiment III

Phosphite combination analogous to German Offenlegungsschrift (German published specification) 1,694,285: a mixture of 40% by weight of

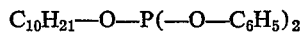

and 60% by weight of 3,4-epoxycyclohexylmethyl-3,4-epoxycyclohexane carboxylate.

(4) Phosphite I according to the invention

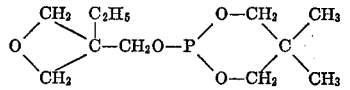

(5) Phosphite II according to the invention

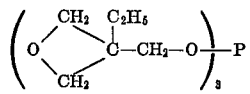

(6) Phosphite III according to the invention

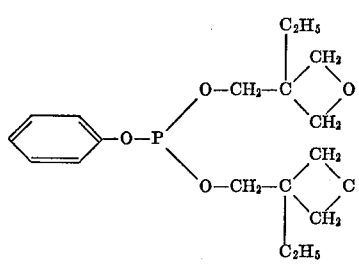

Heat aging

The test specimens manufactured in the manner described above were heat-treated in a drying cabinet at 140°. The light transmission was measured by means of a spectrophotometer. The drop in the light transmission at 420 nm. over the course of the heat treatment in each case serves as a measure of the increasing brown discoloration of the test specimen (see table).

The stability to discoloration is distinctly better in the case of polycarbonates which contain the additives according to the invention than in the case of polycarbonates which contain other phosphites.

The relative viscosity of the polycarbonates stabilized according to the invention showed no reduction compared to the viscosity of the phosphite-free polycarbonate. Accordingly, no degradation of the polycarbonate molecule by the stabilizer has taken place.

Light transmission [1] of the polycarbonate test rods at 420 nm. and a layer thickness of 4 mm. after heat treatment at 140° C.

| Polycarbonate test rod | Amount of stabilizer added, percent | Percent light transmission heat treatment | | | |
|---|---|---|---|---|---|
| | | 0 days | 6 days | 12 days | 21 days |
| Without additive | None | 80.7 | 80.3 | 80.1 | 79.1 |
| Comparison experiment I | 0.05 | 82.0 | 80.4 | 79.2 | 75.0 |
| Comparison experiment II | 0.05 | 85.0 | | | 53.5 |
| Comparison experiment III | 0.05 | 81.7 | 74.4 | 70.7 | 63.1 |
| | 0.05 | 81.7 | | 79.3 | 75.1 |
| Phosphite I according to the invention | 0.05 | 85.8 | 85.1 | 84.1 | 81.8 |
| Phosphite II according to the invention | 0.05 | 84.3 | 84.1 | 84.3 | 82.1 |
| Phosphite II according to the invention | 0.1 | 85.4 | 85.2 | 84.6 | 82.6 |
| Phosphite III according to the invention | 0.1 | 85.5 | | | 82.0 |

[1] Measured according to DIN 5033 and DIN 4646.

It is to be understood that the foregoing examples are for the purpose of illustration and that any other suitable oxetane phosphite, polycarbonate or the like could be substituted provided the teachings of this disclosure are followed.

What we claim is:

1. An aromatic polycarbonate having added a stabilizing amount of a neutral ester of phosphorus acid with at least one oxetane group.

2. The polycarbonate of claim 1 having added 0.01 to 0.2 wt. percent of the acid ester.

3. The polycarbonate of claim 2 having added 0.025 to 0.1 wt. percent of the acid ester.

4. The polycarbonate of claim 1 in which the ester has a boiling point at 0.1 mm. Hg of more than 150° C.

5. The polycarbonate of claim 1 in which the ester is tris-(3-ethyloxethanyl-3-methyl)-phosphite.

6. The polycarbonate of claim 1 in which said neutral ester has the formula (1) 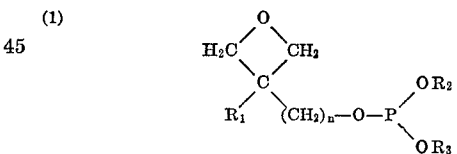

(2) 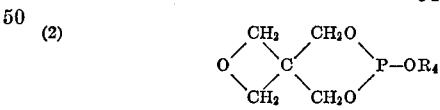

or (3) 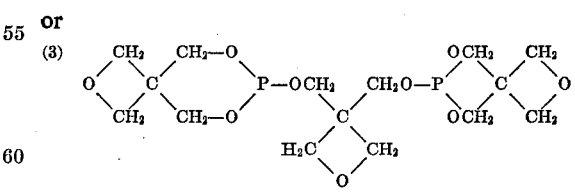

where $n$ is 0 or 1, $R_1$ is hydrocarbon free of acetylenic unsaturation, halomethyl, cyanomethyl, alkoxymethyl, monocarbocyclic aryloxymethyl, monocarbocyclic aralkyloxymethyl or alkanoyloxymethyl, $R_2$ and $R_3$ are

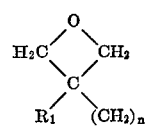

hydrocarbon free of acetylenic unsaturation or halomonocarbocyclic aryl and $R_4$ is hydrocarbon free of acetylenic unsaturation or halomonocarbocyclic aryl.

7. The polycarbonate of claim 1 which is based on bisphenols selected from the group consisting of bis-(4-hydroxyphenyl)-propane-2,2;
bis-(4-hydroxy-3,5-dichlor-phenyl)-propane-2,2;
bis-(4-hydroxy-3,5-dibrom-phenyl)-propane-2,2;
bis-(4-hydroxy-3,5-dimethyl-phenyl)-propane 2,2;
α,α'-bis-(4-hydroxyphenyl)-p-diisopropyl-benzene.

8. The polycarbonate of claim 1 in which the ester is selected from the group consisting of tris-((3-ethyloxetanyl-3)-methyl)-phosphite,
tris-((3-pentyloxetanyl-3)-methyl)-phosphite,
phenyl-bis-((3-ethyloxetanyl-3)-methyl)-phosphite,
2-phenoxy-spiro(1,3,2-dioxaphophorinane-5,3'-oxetane,
3,3-bis-(spiro (oxetane-3',5''-(1'',3'',2''-dioxaphosphorinane-2''))-oxy-methyl)-oxethane,
tris (2,2-dimethylene oxide butyl) phosphite,
bis (2,2-dimethylene oxide butyl) phenyl phosphite,
2,2-dimethylene oxide butyl bis (phenyl) phosphite,
bis (2,2-dimethylene oxide butyl) decyl phosphite,
bis (2,2-dimethylene oxide butyl) p-tolyl phosphite,
2,2-dimethylene oxide butyl bis (o-chlorophenyl) phosphite,
bis (2,2-dimethylene oxide butyl) p-chlorophenyl phosphite,
bis(2,2-dimethylene oxide butyl) benzyl phosphite,
bis (2,2-dimethylene oxide butyl) octadecyl phosphite,
bis (2,2-dimethylene oxide butyl) methyl phosphite,
bis (2,2-dimethylene oxide butyl) cyclohexyl phosphite,
2,2-dimethylene oxide butyl bis (decyl) phosphite,
tris (2,2-dimethylene oxide propyl) phosphite,
bis (2,2-dimethylene oxide propyl) phenyl phosphite,
2,2-dimethylene oxide propyl bis (phenyl) phosphite,
tris (2,2-dimethylene oxide octadecyl) phosphite,
tris(2,2-dimethylene oxide 2-phenyl ethyl) phosphite,
bis (2,2-dimethylene oxide-2-phenyl ethyl) phenyl phosphite,
tris (2,2-dimethylene oxide-2-p-tolyl ethyl) phosphite,
tris (2,2-dimethylene oxide-3-phenyl propyl) phosphite,
tris (2,2-dimethylene oxide-3-chloropropyl) phosphite,
bis (2,2-dimethylene oxide-3-chloropropyl) phenyl phosphite,
tris (2,2-dimethylene oxide-3-bromopropyl) phosphite,
tris (2,2-dimethylene oxide-3-fluoropropyl) phosphite,
tris (2,2-dimethylene oxide-3-cyanopropyl) phosphite,
tris (2,2-dimethylene oxide-3-methoxy propyl) phosphite,
tris (2,2-dimethylene oxide-3-ethoxy propyl) phosphite,
tris (2,2-dimethylene oxide-3-butoxy propyl) phosphite,
tris (2,2-dimethylene oxide-3-octadecyloxy propyl) phosphite,
tris (2,2-dimethylene oxide-3-phenoxy propyl) phosphite,
tris (2,2-dimethylene oxide-3-p-tolyloxy propyl) phosphite,
tris (2,2-dimethylene oxide-3-benzyloxy propyl) phosphite,
tris (2,2-dimethylene oxide-3-acetyloxy propyl) phosphite,
tris (2,2-dimethylene oxide-3-oleoyloxy propyl) phosphite,
tris (2,2-dimethylene oxide-3-stearoyloxy propyl) phosphite,
tris (2,2-dimethylene oxide-3-abietoyloxy propyl) phosphite,
tris (1,1-dimethylene oxide ethyl) phosphite,
bis (1,1-dimethylene oxide ethyl) phosphite,
tris (1,1-dimethylene oxide propyl) phosphite,
2-phenoxy-5,5-dimethylene oxide-1,3,2-dioxaphosphorinane,
2-p-tolyloxy-5,5-dimethylene oxide-1,3,2-dioxaphosphorinane,
2-p-chlorophenoxy-5,5-dimethylene oxide-1,3,2-dioxaphosphorinane,
2-decyloxy-5,5-dimethylene oxide-1,3,2-dioxaphosphorinane,
2-methyloxy-5,5-dimethylene oxide-1,3,2-dioxaphosphorinane,
2-octadecyloxy-5,5-dimethylene oxide-1,3,2-dioxaphosphorinane,
2-benzyloxy-5,5-dimethylene oxide-1,3,2-dioxaphosphorinane,
2(2',2'-dimethylene oxide butoxy)-5,5-dimethylene oxide 1,3,2-dioxaphosphorinane,
2(2',2'-dimethylene oxide propoxy)-5,5-dimethylene oxide-1,3,2-dioxaphosphorinane,
2(2',2'-dimethylene oxide-3'-chloropropoxy)-5,5-dimethylene oxide-1,3,2-dioxaphosphorinane,
1,3-bis (5',5'-dimethylene oxide-1,3,2-dioxaphosphorinanoxy)-2-dimethylene oxide propane.

References Cited
UNITED STATES PATENTS

| | | | |
|---|---|---|---|
| 3,305,520 | 2/1967 | Fritz et al. | 260—45.7 |
| 3,536,660 | 10/1970 | Looker et al. | 260—45.7 |
| 3,209,013 | 9/1965 | Hechenbleikner et al. | 260—333 |
| 3,509,091 | 4/1970 | Cleveland et al. | 260—45.8 |
| 3,382,199 | 5/1968 | Scullin | 260—23 |

DONALD E. CZAJA, Primary Examiner

R. A. WHITE, Assistant Examiner